(12) United States Patent
Volk

(10) Patent No.: US 7,461,879 B2
(45) Date of Patent: Dec. 9, 2008

(54) SKEWER

(75) Inventor: Daniel J. Volk, Alpharetta, GA (US)

(73) Assignee: Volk Enterprises, Inc., Turlock, GA (US)

( * ) Notice: Subject to any disclaimer, the term of this patent is extended or adjusted under 35 U.S.C. 154(b) by 726 days.

(21) Appl. No.: 10/446,599

(22) Filed: May 28, 2003

(65) Prior Publication Data

US 2004/0239131 A1 Dec. 2, 2004

(51) Int. Cl.
*A47J 37/00* (2006.01)
(52) U.S. Cl. ............... 294/1.1; 99/419; D7/683; D28/65
(58) Field of Classification Search .............. 294/61, 294/1.1; D28/65; D7/683; 99/419
See application file for complete search history.

(56) References Cited

U.S. PATENT DOCUMENTS

| | | | |
|---|---|---|---|
| 504,777 A | 9/1893 | Fischer | |
| 623,571 A * | 4/1899 | Shipe | 99/419 |
| 819,798 A * | 5/1906 | Ray | 294/126 |
| 1,113,929 A | 10/1914 | Brown | |
| D113,219 S * | 2/1939 | Cowins | D7/683 |
| 2,404,166 A | 7/1946 | Danilla | |
| 2,557,890 A | 6/1951 | Perry | |
| 2,622,268 A | 12/1952 | Glantzlin | |
| 2,651,251 A | 9/1953 | Brown | |
| D207,245 S * | 3/1967 | Lynn | D7/683 |
| D208,569 S * | 9/1967 | Novak | D7/683 |
| 3,552,017 A * | 1/1971 | Smuts | 30/322 |
| 3,709,141 A | 1/1973 | Schwartzstein | |
| 4,420,493 A * | 12/1983 | Greck | 426/420 |
| 5,386,840 A * | 2/1995 | Lane | 132/329 |
| D367,590 S * | 3/1996 | Brookhouse | D7/683 |
| 5,495,794 A | 3/1996 | Ulysse | |

OTHER PUBLICATIONS

"Planar" definition, Merriam-Webster's Collegiate Dictionary Tenth Edition.*

* cited by examiner

*Primary Examiner*—Michael S Lowe
(74) *Attorney, Agent, or Firm*—Laurence P. Colton; Smith, Gambrell & Russell

(57) ABSTRACT

A skewer for anchoring at least two pieces of foods having a base member and a stem member that has a penetrating tip and a stabilizing member.

11 Claims, 11 Drawing Sheets

SKEWER

BACKGROUND OF THE INVENTION

1. Technical Field

The present invention relates generally to the field of food preparation devices and aids and more particularly to devices for anchoring or holding a wide variety of food items to each other or together such as skewers for food preparation and kabobs.

2. Prior Art

The use of skewers for the purposes of holding or anchoring foods or the like to each other or together is very helpful in the preparation of food items such as entrees. Such skewers are used to hold meats or vegetables in place during cooking, as well as to skewer meat and vegetables together to be grilled for kabobs. As maintaining the position of food items or garnishes during cooking can be of paramount importance, especially in the preparation of expensive entrees or other dishes, the use of skewers has become prevalent in the food service industry.

Combinations of foods that can be combined using skewers are numerous and often selected so that these foods compliment each other in taste. Such combinations can consist exclusively of meats, vegetables, or fruits, or can consist of any combinations thereof. Meats that can be used with skewers include for example beef tenderloin, partially fried and rolled up bacon slices, pieces of boneless chicken or turkey breast, pork cubes, ham cubes, lamb cubes, small meatballs, pieces of sausage, shrimp, scallops and other seafood chunks. To complement such meats, other foods can be cooked with the meats, including for example onions, zucchini or other summer squash, green, red or yellow peppers, carrots, small whole potatoes, fresh mushrooms, and firm cherry tomatoes. The combinations of foods that can be used with skewers are limitless.

Skewers in general are old in the art and range from simple sharpened rods to complex multi-component devices. U.S. Pat. No. 504,777 to Fischer discloses a skewer for closing fowl comprising a central stem that is formed by twisting two pieces of wire together, one of which is provided with a loop, and is used for closing fowl after the fowl has been filled (with stuffing, etc.). U.S. Pat. No. 1,113,929 to Brown discloses a meat clamp or skewer for securely retaining wrapped or rolled meat and that includes a straight shank formed with a flat pointed head having sharpened edges and an angular stop shoulder at the inner end of the head, with an enlarged handle, and with a compressible tension spring coiled about the shank.

U.S. Pat. No. 2,404,166 to Danilla discloses a device for use in roasting poultry that is a one-piece metallic structure with a sinusoidal shank that terminates at one end in a point and in a head shape at the other end. U.S. Pat. No. 2,622,268 to Glantzlin discloses a flat wooden holder or skewer that has a uniform thickness, has sides tapered along to a wedge-like tip and appears to have a structure that may help prevent rotation and may help prevent the device from sliding out of the food. U.S. Pat. No. 2,651,251 to Brown discloses a skewer for aiding in the cooking of a roast that has a unitary length of wire having a stiff shank portion that extends to a pointed end.

U.S. Pat. No. 2,557,890 to Perry discloses a skewer for holding a rolled roast having an elongated pin that is pointed at one end and pointed bars along the skewer lock so to maintain the skewer in place within a piece of meat. U.S. Pat. No. 3,709,141 to Schwartzstein discloses a heat transmitting device for conducting heat into the interior of a roast to aid in the rapid and more uniform cooking of the roast. U.S. Pat. No. 5,495,794 to Ulysse discloses a hand held utensil adapted to hold a vegetable such as a potato for peeling and comprises a handle and a taper rod like element that ends in a tip.

Accordingly, there is always a need for an improved device for skewing or anchoring food items. There also is a need for skewers that are cost effective and to hold food items securely. There is a further need for skewers that are simple and easy to use manufacture and use and perform their intended function without significant user interaction. The present invention is directed to these needs and others.

BRIEF SUMMARY OF THE INVENTION

Briefly, the present invention is a skewer that can be used to anchor or secure a wide variety of food items to each other or together. The skewer of the present invention minimally comprises a base member having a top surface and a bottom surface, a stem member attached at its proximal end to and extending from the bottom surface of the base member, and a penetrating tip attached to or part of the distal end of the stem member for penetrating food items. The top surface of the base member can comprise a curved surface portion. The stem member has a generally "+"-shaped cross-section to provide strength, to help prevent rotation after being inserted into the food, and to provide additional friction to help maintain the skewer within the food. The penetrating tip comprises a pointed or angular tip to facilitate penetration into the food. At least one optional stabilizing member can be positioned along the stem member between the base member and the penetrating tip to further help prevent rotation. Preferably, the skewer is single continuous structure.

In operation and use, the skewer is adapted for anchoring at least two items of food together. As disclosed herein, a user inserts the skewer into or through a first food item and then into or through the subsequent food item or items. More specifically, to anchor a first food item to a second food item, such as a strip of bacon to a filet mignon, the user would wrap the bacon strip around the filet mignon and insert the skewer through the bacon strip and into the filet mignon, in a fashion similar to using a common toothpick. However, the specific structure of the present invention allows for simpler and more accurate insertion and removal, better securing of the first food item to the second food item, and preventing rotation or movement of the first food item relative to the second food item.

Preferably, the user presses the base member to help ensure that the skewer enters the food items relatively easily. A user can add multiple skewers to the at least two food items to help ensure that the food items are anchored as desired. Once a user no longer desires the skewer be in the food items, a user can remove the skewer from the at least two food by simply pulling on the base member. Thus, the skewer provides a user with a device that conveniently and effectively anchors food items.

The combination of elements of the present invention results in on or more advantages, only a few of which follow. First, the skewer of the present invention can be easier for users, particularly those wear gloves, to anchor, remove, and handle. Second, the structure of the skewer can allow the skewer, when in use, to be resistant to rotation. Third, the structure of the skewer can help prevent the first food item from moving relative to the second food item. Fourth, from a cost perspective, the structure of the skewer can be produced with less material and remain relatively strong.

These features, and other features and advantages of the present invention will become more apparent to those of ordinary skill in the relevant art when the following detailed description of the preferred embodiments is read in conjunction with the appended drawings in which like reference numerals represent like components throughout the several views.

PREFERRED EMBODIMENTS OF THE PRESENT INVENTION

Figure 1:
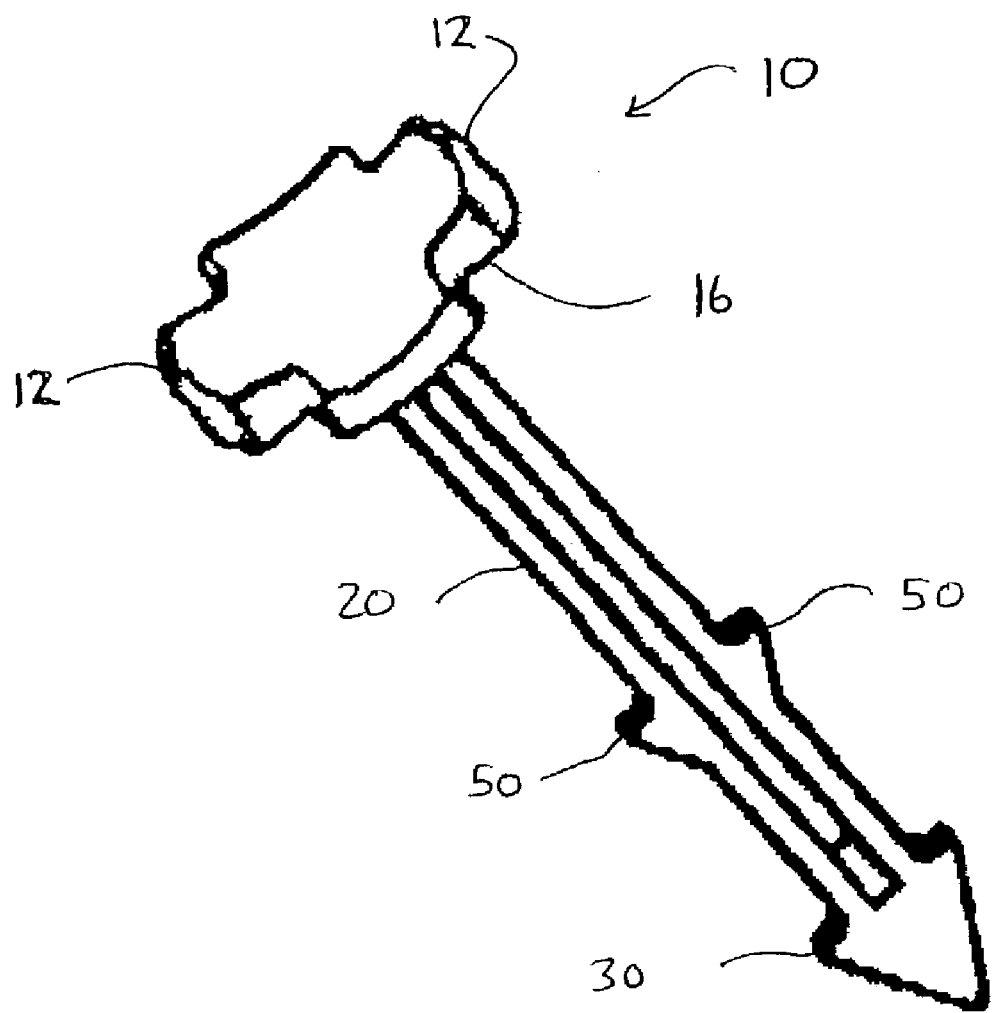
FIG. 1 is a perspective view of one embodiment of the present invention.
Figure 2A:
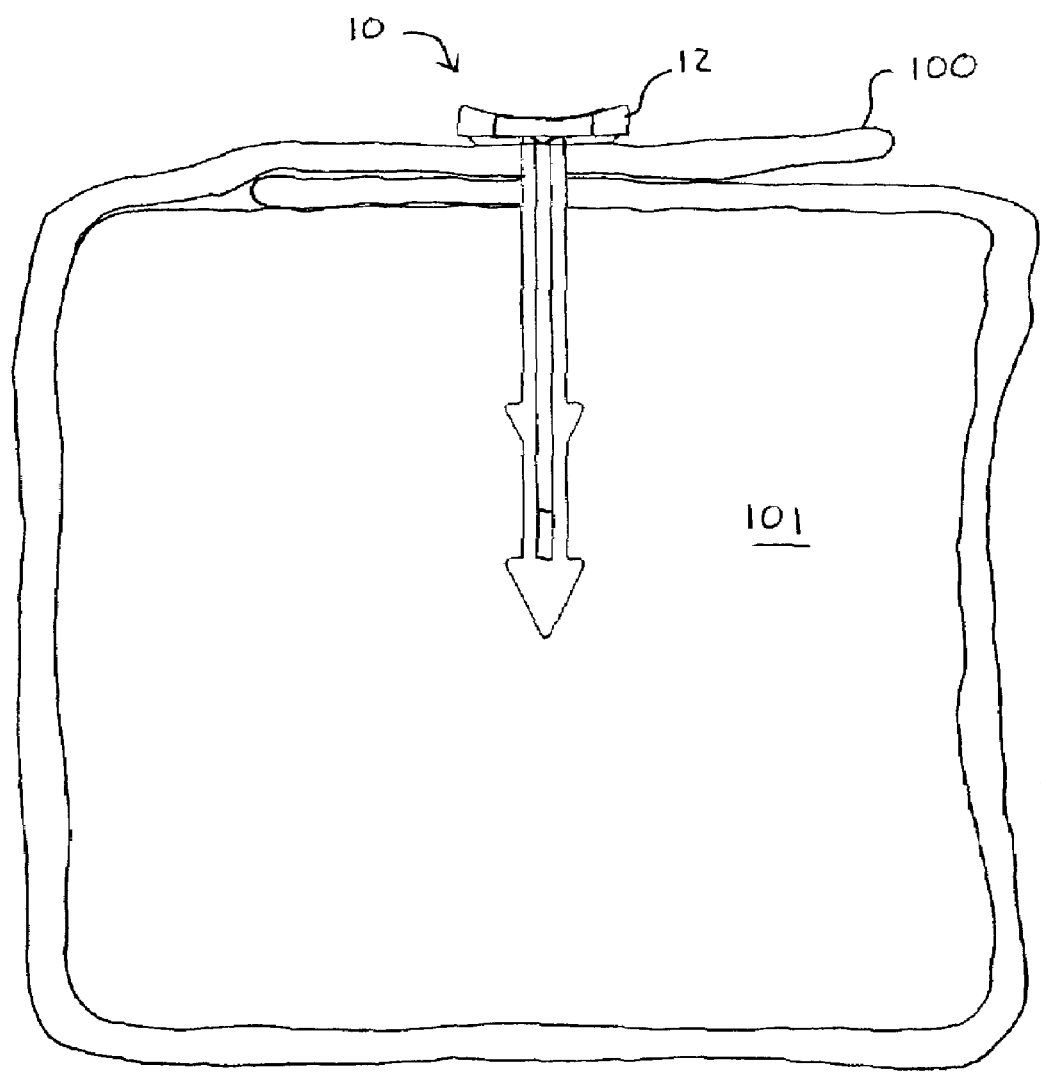
FIG. 2A is sectional side view of the embodiment shown in FIG. 1 anchoring two food items together.
Figure 2B:
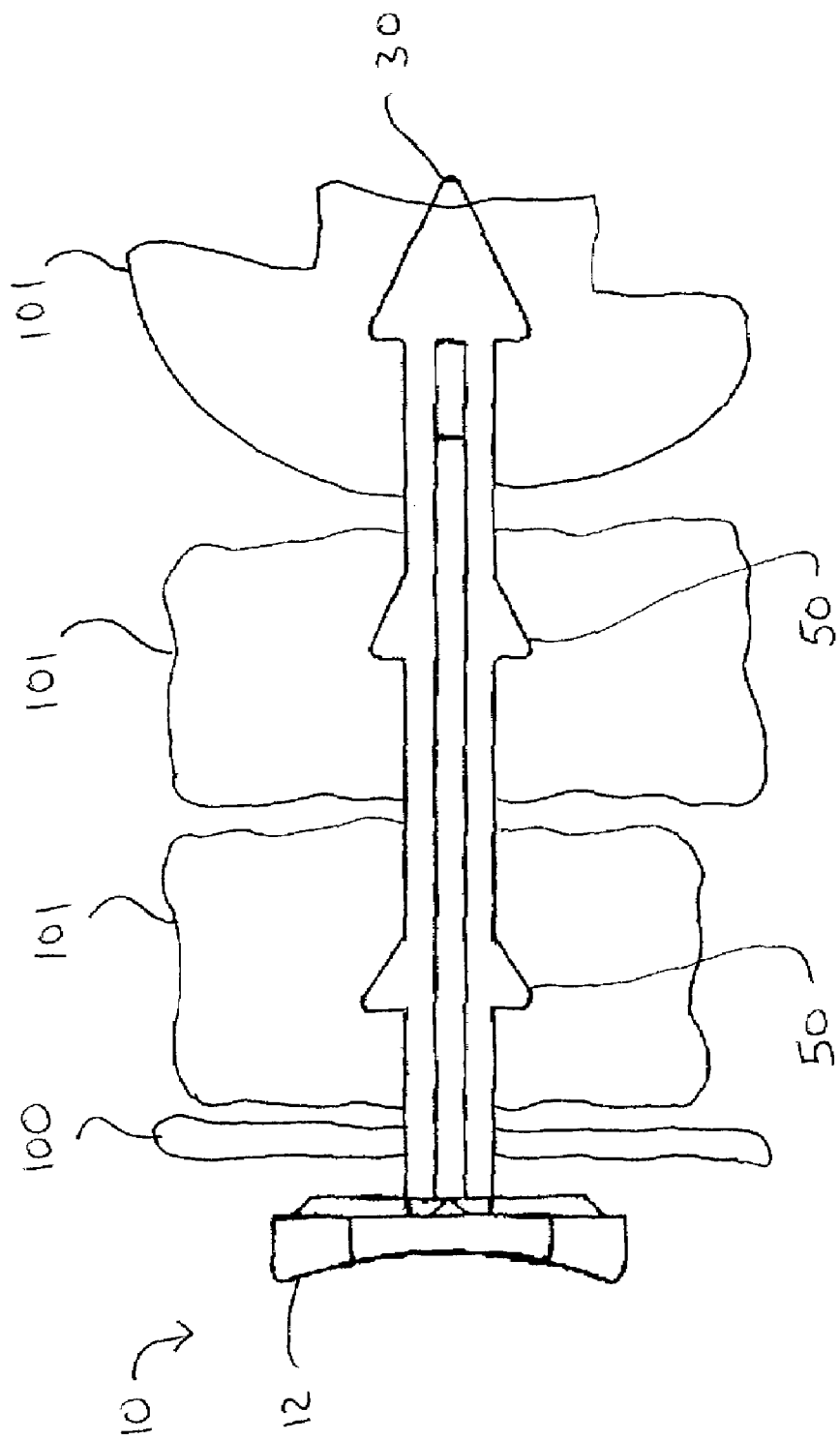
FIG. 2B is a sectional side view of an alternative embodiment of the present invention anchoring several food items together.
Figure 3:
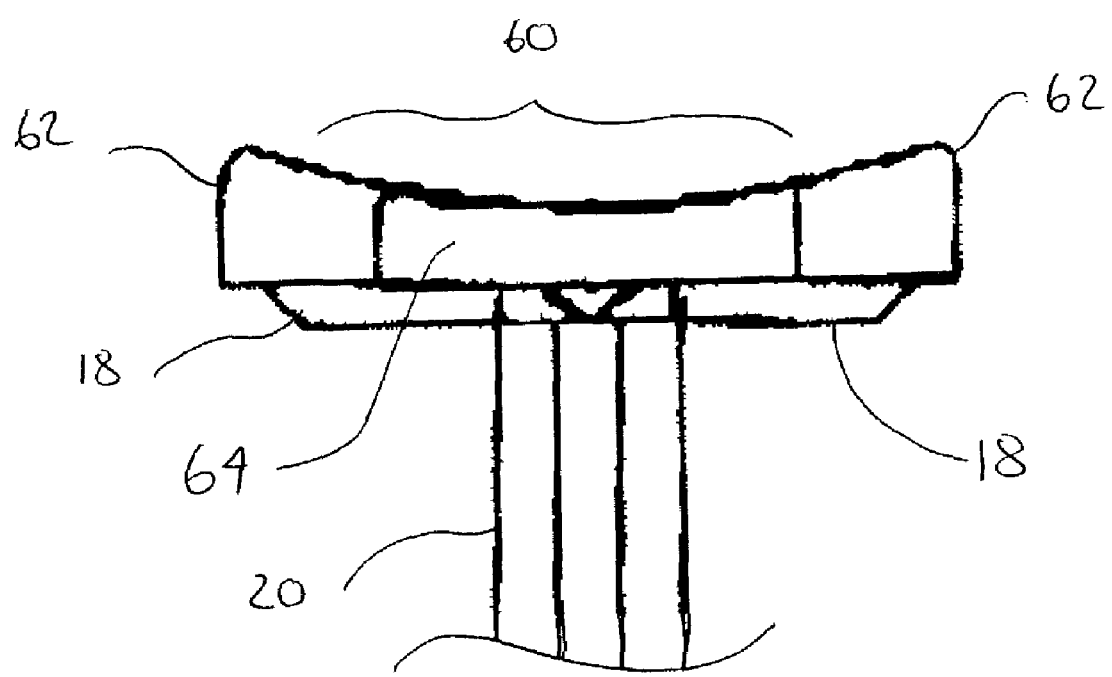
FIG. 3 is side view of the base member of the embodiment shown in FIG. 1.
Figure 4:
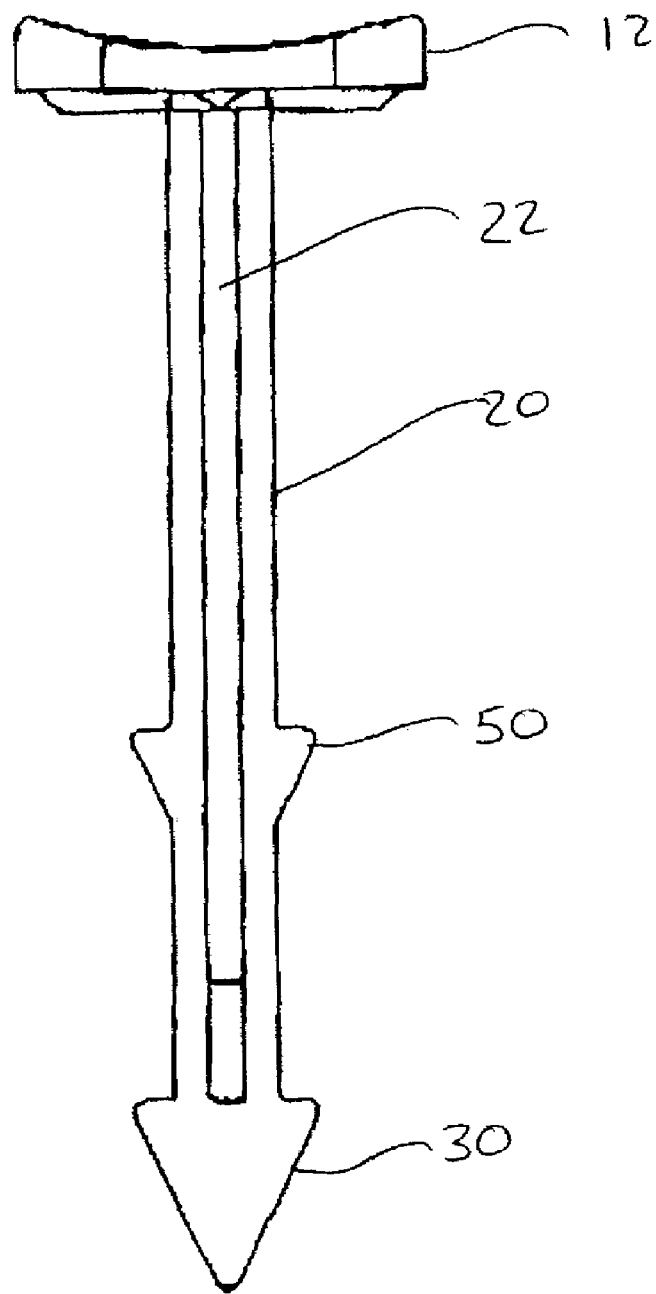
FIG. 4 is a first side view of the embodiment shown in FIG. 1.
Figure 5:
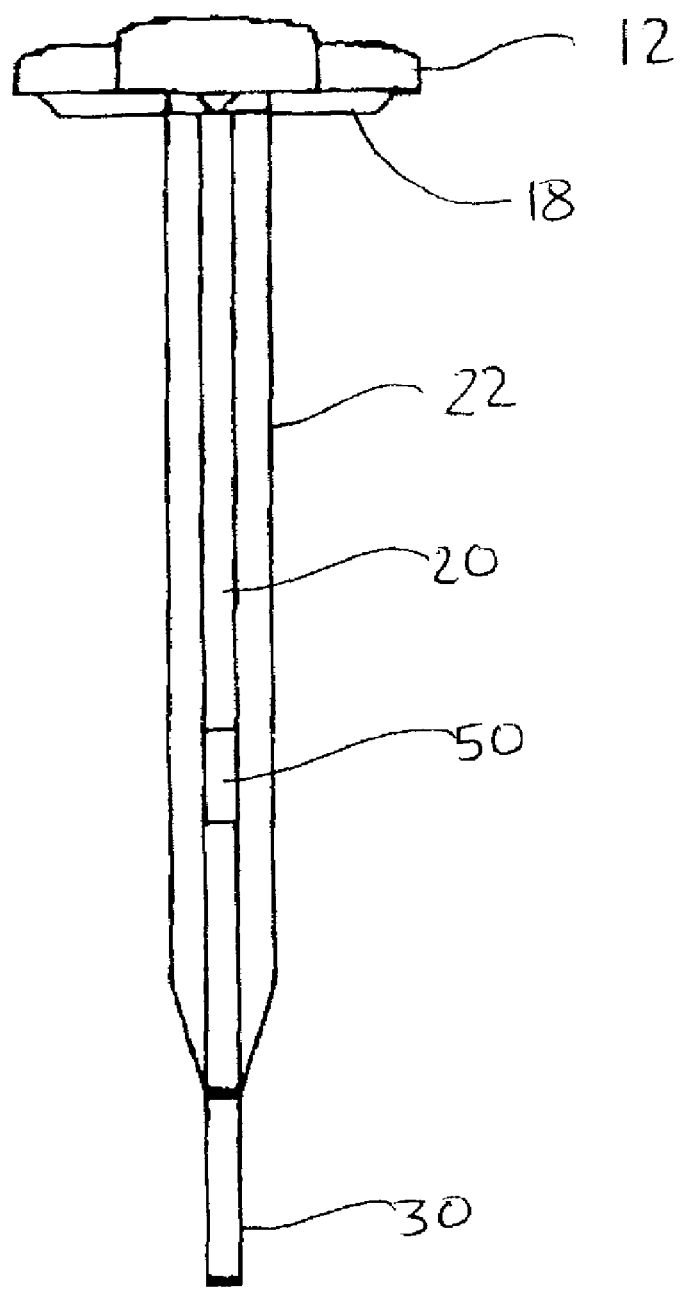
FIG. 5 is a second side view of the embodiment shown in FIG. 1 rotated by 90 degrees from the view shown in FIG. 4.
Figure 6:
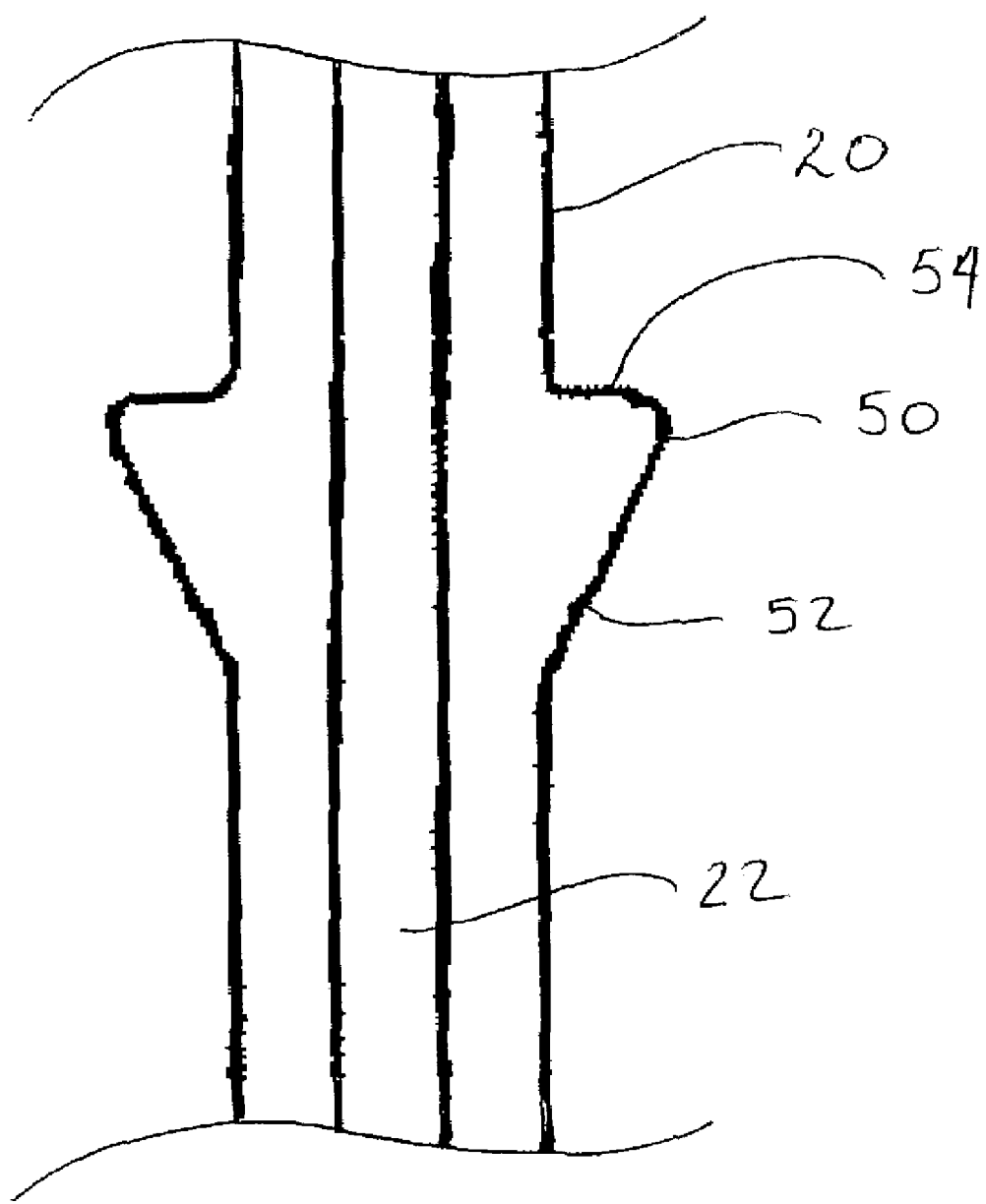
FIG. 6 is a side view of the stabilizing member of the embodiment shown in FIG. 1.
Figure 7:
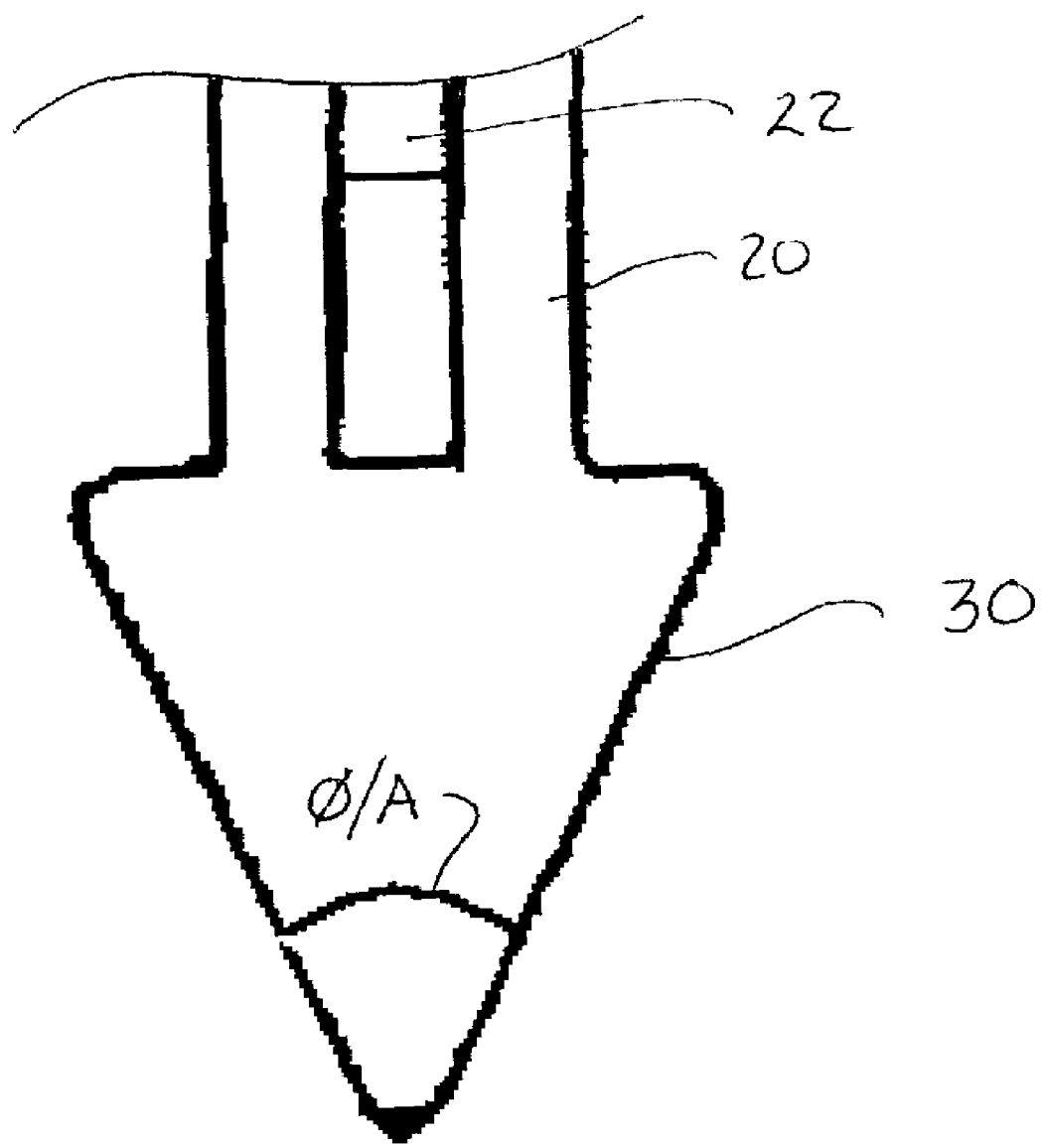
FIG. 7 is a side view of the penetrating tip of the embodiment shown in FIG. 1.
Figure 8:
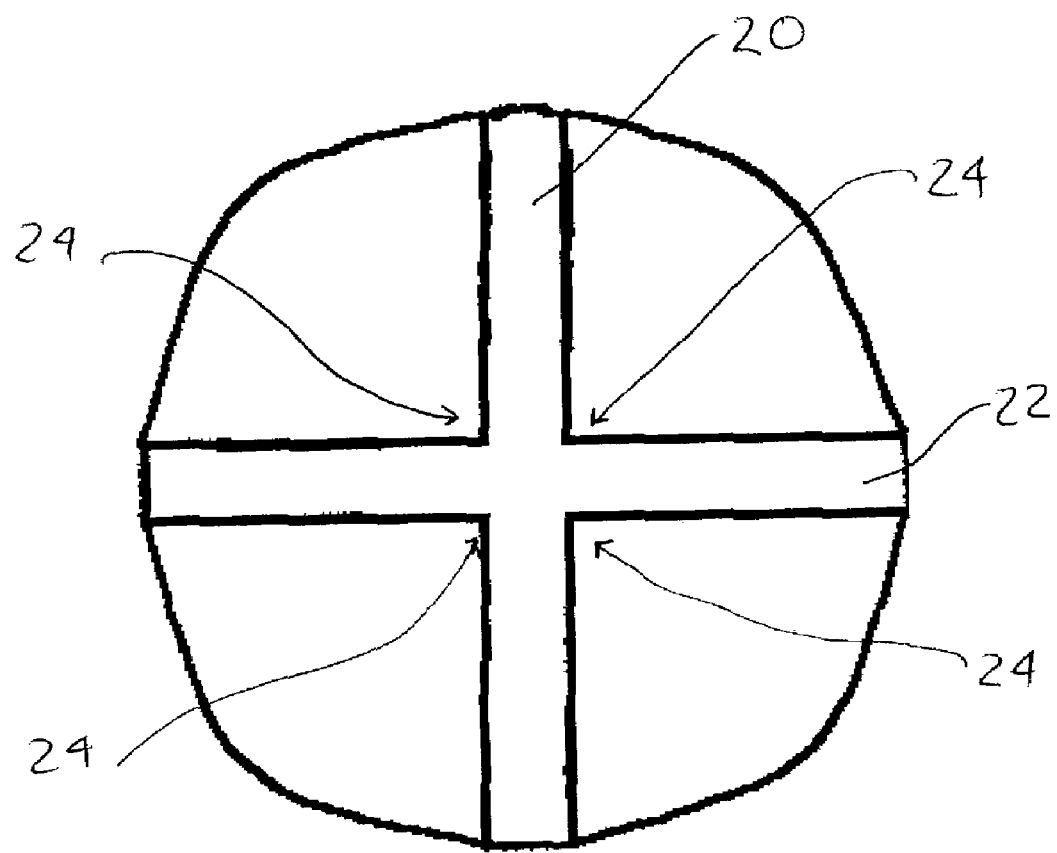
FIG. 8 is cross sectional view of the stem member of the embodiment shown in FIG. 1.
Figure 9:
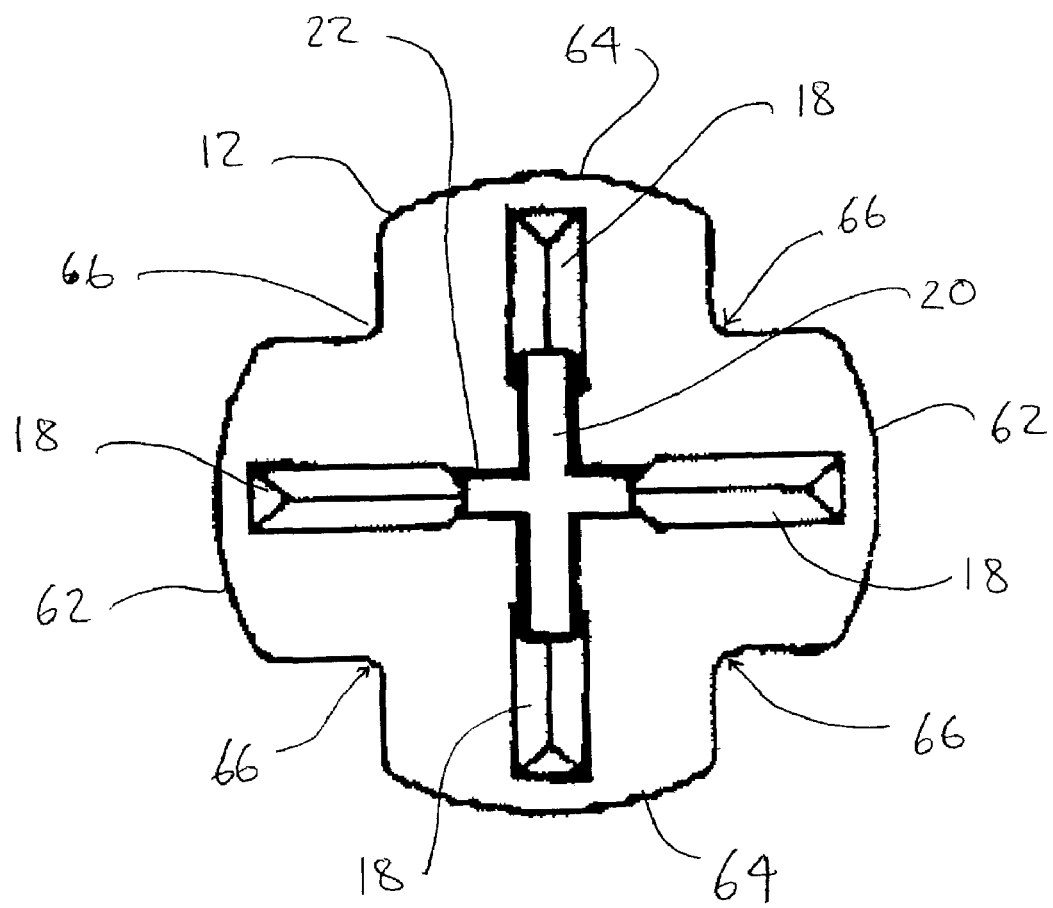
FIG. 9 is a bottom view of the base member of the embodiment shown in FIG. 1.
Figure 10B:
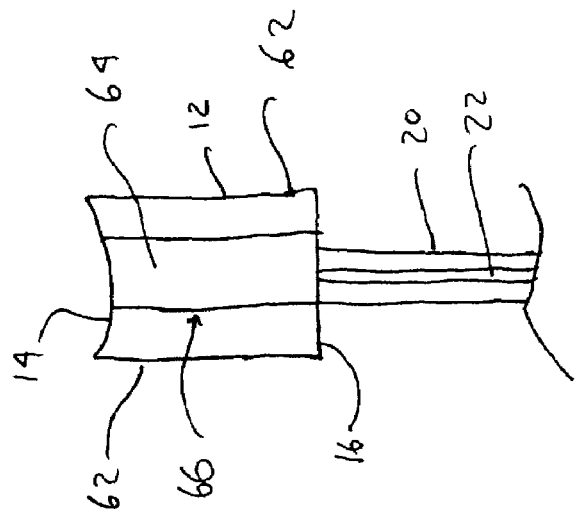
FIG. 10B is an alternate embodiment of the base member.
Figure 10A:
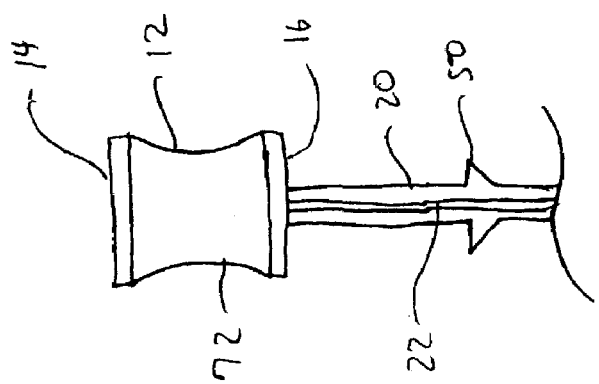
FIG. 10A is an alternate embodiment of the base member.

Illustrative embodiments of the skewer 10 according to the present invention are shown in FIGS. 1 through 9. FIG. 1 is a perspective view of one embodiment of the present invention showing the basic elements of the embodiment. FIGS. 2A and 2B are sectional side views of an illustrative skewer showing the skewer as used to anchor at least two pieces of food together so as to show that the invention can be different lengths depending on the circumstances. FIG. 3 is side view of the base member of an illustrative skewer showing the curved top section of the base member. FIGS. 4-5 are two side views, differing by 90 degrees of rotation, of an illustrative skewer. FIG. 6 is a side view of an example stabilizing member of an illustrative skewer. FIG. 5 is a cross sectional view of the stem section of an illustrative skewer. FIG. 8 is cross sectional view of the stem member of an illustrative skewer showing the "+" sign cross section. FIG. 9 is a bottom or end view of the base member of an illustrative skewer. FIGS. 10A and 10B are alternate embodiments of the base member having elongated shanks for gripping by larger fingers or multiple fingers, and are especially useful in the elongated or kabob embodiment of the invention.

Referring now to FIG. 1, an illustrative embodiment of the present invention is shown. Skewer 10 generally minimally comprises a base member 12 having a top surface 14 and a bottom surface 16 and a stem member 20 having penetrating tip 30 and at least one stabilizing member 50. Base member 12 is positioned at the proximal end of stem member 20 and penetrating tip 30 is positioned at the distal end of the stem member 20. Stabilizing member 50 is optional and if present is positioned along stem member 20 between base member 20 and penetrating tip 30. Preferably, the components of skewer 10 are a unitary continuous structure.

FIGS. 2A and 2B show skewer 10 in two illustrative uses placed into at least two food items, namely a first food item 100 and second or subsequent food items 101. FIGS. 2A and 2B are sectional views to show the manner in which skewer 10 is inserted through food items 100, 101. As shown, stem member 20 is inserted completely through first food item 100 and at least partially through second or subsequent food item (s) 101. Preferably, when skewer 10 is fully inserted, the bottom surface of base member 12 rests upon first food item 100, and therefore limits the depth to which skewer 10 can penetrate into the combined food items 100, 101. While FIG. 2A shows skewer 10 through only two food items 100, 101 it is evident that skewer 10 can be used with more than two food items. In fact, FIG. 2B shows skewer 10 holding several food items 100, 101 in a kabob style.

FIG. 3 is a side view of base member 12. Base member 14, when viewed from the top, has a "+" or four-leaf clover shape. The top surface 14 of base member 12 is curved in a pseudo-concave upwards away from stem member 20 so as to form indentation 60. Thus, indentation 60, which refers to the shape of the top surface 14 of base member 12, has a distinctive curvature. More specifically, the curvature of top surface 14 is similar to a portion of a side of a cylinder. This distinctive curvature creates a variation in the thickness of base member 14, with two opposing edges 62 being thicker than the remaining two opposing edges 64. Alternatively, the curvature of top surface 14 can be a true concave surface similar to a bowl.

Indentation 60 with edges 62 provides a user of skewer 10 with a convenient pad or position to press down upon so to facilitate the penetration of skewer 10 into food items 100, 101. The design of indentation 60 helps "catch" the finger of a user as the user presses top surface 12 or indentation 60, thus allowing a greater concentration of finger pressure to be transmitted in the direction of the stem member, unlike convex caps such as on thumb tacks, which facilitate the slipping of the finger off of the thumb tack. More specifically, as the user presses down on indentation 60, the finger force is directed to penetrating tip 50 to provide leverage so to allow skewer 10 to more easily penetrate food items 100, 101.

Thicker edges 62 of indentation 60 also create a position for a user or handler to grip, which can be particularly convenient when the user is wearing gloves. Further, the thicker edges 62 also provide a user with a convenient place to grip skewer 10 when used as a kabob holder. Thicker edges 62 also can provide strength to base member 20. The notches 66 on base member 12 provide a further means for assisting the user in removing the skewer 10 from food by providing additional frictional surfaces. Further, the "+" or four leaf clover shape of base member 12 saves material costs when compared to a rounded head member of the same diameter.

FIGS. 4 and 5 show two side views, differing by a 90 degrees rotation, of skewer 10 showing stem member 20 in more detail. Base member 12 is at the proximal end of stem member 20, penetrating tip 30 is at the distal end of stem member 20 and one or more stabilizing members 50 are at positions between penetrating tip 50 and base member 12. As shown, while stabilizing member 50 and penetrating tip 30 are generally coplanar with respect to each other, this is not required, and penetrating tip 30 and stabilizing member 50 can be rotationally offset from each other. Further, if more than one stabilizing member 50 is used, the various stabilizing members 50 can be coplanar or rotationally offset from each other.

As shown in FIGS. 4 and 5, skewer 10 can be considered to comprise a base member 12 having a planar stem member 20 extending from the bottom surface of the base member 12.

The planar stem member 20 terminates distal from the base member 12 in a penetrating tip 30. Penetrating tip 30 is a generally arrow-shaped or pointed structure, with the point pointing away from the direction of base member 12. Using this description of stem member 20, stem member 20 further comprises perpendicular ridges 22 extending along at least a portion of the length of stem member 20 from base member 12 to a terminating point proximal to penetrating tip 30. Ridges 22 angle inward towards planar stem member 20 proximal to and in the direction of penetrating tip 30 to give skewer 10 an acceptable pointed silhouette for penetrating food items 100, 101. The combination of planar stem member 20 and ridges 22 give the stem member 20 and ridges 22 combination its "+" shaped cross section.

FIG. 6 is sectional side view of stem member 20 focusing on stabilizer member 50. Stabilizing member 50 is designed to help ensure that skewer 10 remains in food items 100, 101 after skewer 10 has been placed therein, that skewer 10 does not rotate within food items 100, 101, and that food items 100, 101 do not rotate while secured on skewer 10. Stabilizing member 50 can have a thickness that is generally the same as the thickness of planar stem member 20, namely thickness of the material or the distance between the ridges 22.

Stabilizer member 50 provides asymmetrical resistance to the removal of skewer 10 from food items 100, 101. Preferably, as shown, stabilizer member 50 comprises a flat or planar, generally triangularly configured body 52 that extends beyond the width of the stem member 20. The adjacent two sides of stabilizing member 50 are tapered inwardly to form the side of the triangle. This taper allows stabilizing member 50 to penetrate food items 100, 101 more easily. As stabilizing member 50 passes into food items 100, 101, the food items close around the back sides 54 of stabilizing member, as show in FIGS. 2A and 2B, thus helping to secure skewer 10 relative to food items 100, 101. The interlocking action of body 52 with one of the food items 100, 101 serves to increase the frictional hold between the food item and skewer 10 and effectively increases the anchoring power of skewer 10.

Additionally, the flat structure of stabilizing member 50 helps to prevent skewer 10 from rotating within food items 100, 101. Rotation with food items 100, 101 can cause the hole created by skewer 10 in food items 100, 101 to become enlarged, thus allowing skewer 10 to become loose or slip out of food items 100, 101. The structure of stabilizing member 50 helps prevent this. This can be important when anchoring a bacon strip to a filet mignon, as exemplified in FIG. 2A. Similarly, when many food items 100, 101 are to be placed on skewer 10, a skewer with many stabilizing members 50 can be used to help prevent the many food items 100, 101 from rotating on skewer 10. This can be important when cooking kabobs, as exemplified in FIG. 2B.

Although stabilizing member 50 is shown positioned in second food item 101 in FIG. 2A and in fourth food item 101 in FIG. 2B, it is understood that stabilizing member 50 can rest within any one of subsequent food items 101 depending on the thickness of first food item 100 or the position of stabilizing member 50 along stem member 20. While skewer 10, as shown, has a single stabilizing member 50, the number of stabilizing members can be varied dependent upon the specific food items 100, 101 being anchored and the specific use of skewer 10. In some embodiments of the present invention, skewer 10 can have more than one stabilizing member 50. In other embodiments, it is possible that stabilizing member 50 is not needed. One of ordinary skill in the art can select the appropriate number of stabilizing members 50 based on the foods items 100, 101 used with skewer 10.

The stabilizing member 50 and the "+" shape of the stem member 20 also help all the food items 100, 101 to turn together. This helps prevent food items 100, 101 that stick to the cooking surface from not rotating when the skewered grouping of food items 100, 101 is rotated.

FIG. 7 is a sectional side view focusing on one example of penetrating tip 30 designed as an arrowhead. To promote penetration of skewer 10 into food items 100, 101 preferably the arrow has an angle A of between 30 and 70 degrees. As angle A is made small, penetrating tip 30 becomes sharper. While a smaller angle A is likely to make penetration of food items 100, 101 easier, a smaller angle also may more easily rip into the gloves of a user. As larger angle A could make penetration of food items 100, 101 more difficult. Angle A can be varied during manufacture to produce different types of skewers 10.

FIG. 8 shows the cross section of stem member 20 as shaped similar to a "+" sign resembling the intersection of two perpendicular planes. Ridges 22 define valleys 24 that increase the surface area of stem member 20. Valleys 24 along stem member 20 enhance the surface area of stem member 20 so to provide a relatively large surface area that contacts with the food items 100, 101. Further, the combination of ridges 22 and valleys 24 provide frictional resistance to help maintain skewer 10 anchorage in food items 100, 101.

One advantage of the "+" shaped cross-section of stem member 20 is that it will aid in preventing skewer 10 from rotating in the at least two food items 100, 101. More particularly, the cross-shaped stem member 20 provides rotational resistance to the spinning of skewer 10 within the at least two food items 100, 101. Another advantage of the "+" shaped cross-section is that "+" shaped structures requires less material when manufactured than a structure having a circular cross-section of the same diameter, yet "+" shaped structures retains much of the same bending strength.

Optionally, as shown in FIGS. 3 and 9, bottom surface 16 of base member 12 can have ridges 18 to help secure base member 12 upon the first food item 100. Ridges 18 extend outwardly from base member in the same general direction as stem member 20. Ridges can have a triangular cross section with the apex of the triangle in a position to contact food item 100. Ridges 18 help secure first food item 100 to second food item 101 and causing minimal damage to first food item 100. For example, ridges 18 can press the first food item 100 against the second food item 101 without excess penetration or ripping of the first food item 100. Ridges 18 help prevent skewer 10 from rotating relative to food item 100, or vice versa, by adding resistance between food item 100 and base member 12.

Ridges 18, if manufactured to a greater height, also could cause the cap to be farther from the food items 100, 101 and make it easier to pull out. In effect, extended ridges 18 would position the cap to be displaced from the food items 100, 100, allowing the user to grasp the base member 12 somewhat away from the food items 100, 101.

FIGS. 10A and 10B show alternate embodiments of the base member 12. FIG. 10A illustrates a pushpin style base member 12. Pushpin style base member is generally a round spool-like structure that may have a convex side surface 72 for ease of gripping by the user's fingers or hand. FIG. 10B illustrates an elongated "+" or four-leaf clover shaped base member 12. Elongated "+" shaped base member 12 is generally the same cross section as the base member 12 shown in FIG. 9, but has a greater height. The greater height of the base member 12 as illustrated in FIGS. 10A and 10B are useful for gripping by multiple fingers or the hand, and are useful in the elongated skewer 10 embodiment shown in FIG. 2B for use with kabobs. Similarly, for smaller versions of the skewer 10, the greater height of base member 12 makes skewer 10 easier to pull out of the food items 100, 101.

In operation and use, skewer 10 is adapted for securing at least two items of food to each other or together. As described herein, skewer 10 is placed into and generally through first food item 100 and then into and/or through subsequent item (s) 101. Preferably, the user presses base member 20 to help ensure that skewer 10 remains locked in place within food items 100, 101. Further, a user can add multiple skewers 10 to the food items 100, 101 to help ensure that the food items 100, 101 are anchored together. Additionally, a user can remove skewer 10 from food items 100, 101 by simply pulling on base member 10 so to pull skewer 10 from food items 100, 101. Thus, skewer 10 provides a user with a device that can flexibly secure food items 100, 101 together.

The orientation of skewer 10 within food items 100, 101 is often times determined by the angle of the initial penetration. As such, the user of skewer 10 can determine the final position of skewer 10 within food 100, 101 by inserting skewer 10 at an appropriate angle. For example, some culinary artists may choose to insert skewer 10 from the top down, while other culinary artists may choose to insert skewer 10 from the side, and still other culinary artists may choose to insert skewer 10 at some angle there between. One of ordinary skill in the art can select an angle of penetration suitable to achieve optimal positioning or aesthetics.

Foods items 100, 101 and the number of food items 100, 101 that can used with skewer 10 are various and only limited by culinary artists. For example, skewer 10 can be used to secure a piece of bacon on a filet mignon. Alternatively, skewer 10 can be used to secure a mushroom on a mushroom or a mushroom on a filet mignon. Alternatively, skewer 10 can be used to cook kabobs. One of ordinary skill in the art can use skewer 10 with most foods that have some degree of hardness to them.

The length of stem member 20 also can depend on the food items 100, 101 used or the number of food items 100, 101 used with skewer 10. For example, skewer 10 can be manufactured smaller in length when the one food item 100 is being anchored to only a second food item 101, or when the foods items 100, 101 being anchored are less thick. Alternatively, skewer 10 can be manufactured with a greater length when the use is with food items 100, 101 that are of greater thickness or many food items 100, 101 are being anchored together in a kabob style. If stem member 20 is too long, stem member 20 will stick out from the food, which can be undesirable. The length can be varied during manufacture so long as skewer 10 retains the structural integrity to withstand longitudinal insertion forces and provide anchoring to food items 100. 101. Preferably, stem 20 is long enough to penetrate the food items 100, 101 being anchored without undue breakage. One of ordinary skill in the art can determine a length and thickness for stem member 20 that will be suitable or optimal for the particular food being anchored.

The surface of stem member 20 can have various textures. In some cases, the texture can be designed to help anchor skewer 10 in food 100. For example, to help improve anchorage of skewer 10 in food, it is possible to select a texture that is rough, dimpled, bumpy or ridged. Alternatively, a smooth texture can be select to make skewer 10 easier to remove from food item 100, 101. One of ordinary skill in the art can select an optimal texture without undue experiment.

The relatively simple structure of skewer 10 can allow it to be manufactured relatively easily with inexpensive materials. For example, skewer 10 can be formed of plastic, metal, wood or other materials. Preferably, skewer 10 can be molded, forged or carved from a single piece of material that can withstand cooking and food processing temperatures (which can approach and exceed 500° F. or 260° C.). Such plastics, metals, woods and other materials are known in the art.

It is preferable to use non-metal materials of manufacture because of the use of metal detectors during the food processing operations. For example, when processing food items 100, 101 prior to packaging and sale to the consumer, the food items 100, 101 often are cut, injected with flavorings or broths, or combined with other like food items 100, 101. The devices used to cut, inject or combine often are metal, such as needles or knives, and portions can break off during the processing stages. Metal detectors are used to find such broken pieces that may have become embedded in the food items 100, 101. A metal skewer 10 thus would set off the metal detector, hindering the ability to search for and remove broken processing pieces. Currently, most prior art skewers are made of metal.

The foregoing detailed description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

What is claimed is:

1. A skewer for anchoring at least two food items together comprising:
    a) a base member having a top surface and a bottom surface;
    b) a stem member comprising a planar member lying in a plane and two perpendicular ridges together forming a plus sign (+) cross section along the stem member, wherein a proximal end of the stem member is attached to the bottom surface of the base member and the stem member extends from the bottom surface of the base member; and
    c) a penetrating tip extending from a distal end of the stem member,
    whereby the perpendicular ridges help anchor the skewer into the at least two food items and provide resistance to the removal of the skewer from and the rotation of the skewer within the at least two food items;
    wherein the plus sign (+) cross section extends along at least a portion of the length of the stem member from the base member to a terminating point proximal to the means for penetrating.

2. The skewer as claimed in claim 1, wherein the means for penetrating the at least two food items is shaped as an arrowhead.

3. The skewer as claimed in claim 1, wherein the top surface of the base member is curved.

4. The skewer as claimed in claim 1, wherein the top surface of the base member is curved concavely in one direction.

5. The skewer as claimed in claim 1, wherein the skewer is one continuous structure.

6. The skewer as claimed in claim 1, wherein the skewer is used for kabobs.

7. The skewer as claimed in claim 6, wherein the top surface is curved concavely in at least one direction.

8. The skewer as claimed in claim 7, wherein the top surface is concavely curved in one direction.

9. The skewer as claimed in claim 6, wherein the skewer is made from a plastic material.

10. A skewer for anchoring at least two food items comprising:
  a) a base member having a top curved surface and a bottom surface;
  b) a stem member extending from the bottom surface of the base, the stem member having a plus sign (+) cross section including a planar member lying in a plane and two ridges extending perpendicularly along the planar member from the bottom surface of the base member;
  c) a triangularly shaped penetrating tip extending from the distal end of the stem member; and
  d) at least one stabilizing member having a flat, generally triangularly configured body to that protrudes beyond the width of the stem member and is positioned along the stem body between the base member and the penetrating tip;

wherein the plus sign (+) cross section extends along at least a portion of the length of the stem member from the base member to a terminating point proximal to the penetrating tip;

whereby the at least one stabilizing member helps anchor the skewer into the at least two food items and the plus sign (+) cross-section of the stem member increases the rotational resistance of the skewer within the at least two food items.

11. The skewer as claimed in claim 10, wherein the skewer is one continuous structure.

* * * * *